United States Patent [19]
Rossi

[11] 3,854,979
[45] Dec. 17, 1974

[54] PROCESS FOR APPLYING GLASSY CARBON COATINGS

[75] Inventor: Ronald C. Rossi, Torrance, Calif.

[73] Assignee: The Aerospace Corporation, El Segundo, Calif.

[22] Filed: June 29, 1972

[21] Appl. No.: 267,436

[52] U.S. Cl......... 117/46 CC, 117/46 CB, 117/121, 117/226, 117/228
[51] Int. Cl.............................................. B44d 1/20
[58] Field of Search.... 117/46 CC, 46 CB, DIG. 11, 117/121, 226, 228

[56] References Cited
UNITED STATES PATENTS

| | | | |
|---|---|---|---|
| 1,054,902 | 3/1913 | Bradley et al. | 117/226 |
| 1,462,003 | 7/1923 | Bleecker | 117/46 CB |
| 1,549,867 | 8/1925 | Grareman | 117/46 CB |
| 2,697,028 | 12/1954 | Baker et al. | 117/226 |
| 2,911,319 | 11/1959 | Peter | 117/226 |
| 3,027,278 | 3/1962 | Reick | 117/226 |

*Primary Examiner*—William D. Martin
*Assistant Examiner*—Janyce A. Bell
*Attorney, Agent, or Firm*—Francis R. Reilly

[57] ABSTRACT

A process is provided for coating ceramic oxide, carbon and graphite substrates with a thin, well adhered surface layer of impervious, vitreous or glassy carbon glaze. Polyvinylchloride, polyvinylfluoride or other natural or synthetic organic substance is decomposed by heating in an inert atmosphere at 375°–410°C. for 5 to 100 minutes. The decomposition product is dissolved in an aromatic solvent, preferably benzene or toluene. The substrate is coated in the solution by dipping and baked for about 12 minutes in an inert atmosphere at 800°–1200°C. Repeated coatings may be applied for a thicker carbon glaze.

9 Claims, No Drawings

3,854,979

PROCESS FOR APPLYING GLASSY CARBON COATINGS

BACKGROUND OF THE INVENTION

1. Field of the Invention

The invention relates to the coating of ceramic and carbon parts and objects with an impervious glassy carbon coating.

2. Description of the Prior Art

Glassy carbon is a recently developed material characterized by its purity, hardness, high compressive strength, isotropy and imperviousness to liquids and gases. This form of carbon has the physical attributes of silica glass.

Glassy carbon is produced by the controlled pyrolysis of certain natural or synthetic organic precursor materials. Examples of the precursor are the phenol and furan resins such as phenol-formaldehyde resin and furfuryl alcohol and also natural organic polymers such as coal pitch and petroleum pitch. Past techniques involve initially preforming the precursor to the desired end product shape and decomposing it at high temperatures to transform it to monolithic glassy carbon.

The prior process and the resulting glassy carbon products have deficiencies. The precursor undergoes as much as 20 percent shrinkage during pyrolosis and carbonization and it is therefore difficult to achieve accuracy of dimensions in the final product. The shapes of the products must be planar or of simple contour without reentrant curves and are limited in thickness to ¼ inch. Once formed the products cannot be conveniently machined or otherwise reworked to correct inaccuracies because of the glassiness of the material. Solid glassy carbon parts and pieces are brittle and prone to breakage when subject to impact.

SUMMARY OF THE INVENTION

The principal object of the present invention is to provide a process for applying a coating or glaze of glassy carbon to a ceramic oxide, carbon or graphite substrate. The substrate is formed to any desired shape and then coated with glassy carbon. The product then has the desired strength of the substrate and the surface characteristics of glassy carbon.

One presently attractive application of glassy carbon coatings is to a transcutaneous skeletal fixation device implanted in the end of the severed bone of an amputated stump. The device passes through the skin and attaches to a prosthesis. Ceramics are suitable in skeletal repair by virtue of their strength, resistance to attack by body fluids, and compatability with body tissue. Clinical tests demonstrate that bone tissue not only grows up to the ceramic but also invades the pores of the ceramic to provide a good mechanical bond between the bone and the implant. However implants extending to the exterior of the body must be sealed at the skin juncture to prevent invasion by bacteria and leakage of body fluids. This seal will not naturally form about a ceramic. However, it has been shown that the epithelium will grow contiguous to glassy carbon and create a seal thereto. Thus a ceramic implant with a coating of glassy carbon will have the structural quality of the ceramic and still enable the formation of a skin seal to its glassy carbon surface.

More obvious applications of glassy carbon coating of the invention are to crucibles, boats and other containers of porous carbon or ceramics. These materials have high temperature endurance but are penetrated by and absorb contained fluids. A glassy carbon lining or glaze applied to these containers completely seals their porous surfaces and can withstand equally high temperatures without undergoing degradation from penetration of the contained fluid.

Numerous other specific uses of the present impervious glassy carbon coating will become apparent with an understanding of the invention.

The practice of the invention involves the selection of a precursor material such as one selected from a group of halogenated linear polymers. Most common of these are in the class of vinyl resins as polyvinylchloride (PVC). The precursor is heated to a temperature of 350° to 450° C. in an inert atmosphere for a time sufficient to decompose it to a hydrocarbon with a C to H mass ratio approximately 12 – 13 to 1. indicative of a compound with a C:H atomic ratio of 1:1 The optimal temperature for PVC is approximately 390° C. and the time at this temperature is about 5 minutes, minimum, with times in excess thereof having no apparent further reducing effect on the PVC precursor. After this treatment the material is viscous and glossy black. Preparatory to the above process step the PVC is ground to the granularity of sand to assure its thorough decomposition.

The residue is allowed to cool and become solidified and will then remain stable under ambient conditions. The residue ground to a 1 – 10 micron powder and is made into a slurry by dissolving it in a liquid aromatic solvent, of which benzene is one of the more suitable solvents. The concentration of decomposed PVC in solution is preferably between 200 to 450 grams per liter and with the exact concentration varying as a function of the surface finish and porosity of the substrate to be coated. The slurry is improved by filtering to remove undissolved particles.

In the use of natural organic materials, as the precursor, the resultant resin is normally liquid and directly mixed with a solvent to form the slurry. This resin as obtained from petroleum, e.g. crude oil, is pitch and is produced by normal, well known distillation processes.

The carbon or ceramic article is coated with the slurry by dipping, spraying or brushing. Air drying follows to evaporate the solvent. The article is placed in an oven whose chamber is then evacuated and backfilled with an inert gas such as argon. The oven temperature is raised to between 800° and 1,200° C. at a rate of 30° to 40° per minute. Within 10 to 15 minutes after reaching maximum temperature the surface of the article has formed thereon a film of glassy carbon. The dipping, drying and curing steps are then repeated one to five or more times. Experimentation shows that glassy carbon coatings of ½ to 1 mil thickness have the best quality and are effective to provide the necessary seal and toughness.

PREFERRED EMBODIMENTS OF THE INVENTION

The process involved in the practice of the present invention of applying a glassy carbon coating involves:

a. Preparation of the Precursor,

The starting material or precursor is selected principally from among the polyvinyl resins or natural organic polymers. Polyvinylchloride (PVC) is herein used as exemplary of the invention but it is to be understood that other resins are equally operative. The PVC is ground to the granularity of sand (½ mm.). A quantity of the precursor is then placed in a baking chamber which is evacuated and backfilled with an inert gas, e.g. argon. The temperature within the chamber is elevated at a rate of 15°–20° C. per minute to 390 (±5)° C. and thereat thoroughly reduced or decomposed. Dry precursor requires as much as 90 minutes for decomposition. Isopropanol may be added to the charge to serve as a heat transfer medium through the powdered mass and will reduce the required time to as little as 5 minutes. It has been demonstrated that this first process step is temperature dependent and products of decomposition at significantly higher or lower temperature do not produce the desired end coating. After curing at about 390° C. the material is a molten, lustrous black, viscous mass that solidifies on cooling to ambient temperature. Analysis of the product reveals a composition of more than 99 percent carbon and hydrogen with a mass ratio between 12 and 13 to 1 indicating its chemical composition as approximately $C_nH_n$, where n is a whole number.

The following table 1 includes data on examples of PVC decomposition producing intermediary materials that were subsequently applied as a glassy carbon glaze.

bles, and peeling. Subsequently, slurry solutions were prepared at concentrations of 250 and 400 g/liter. Various combinations of the two solutions were used sequentially in three cure cycles at 825° C. for 12 minutes. Results show that the 250 g/liter solution is too thin to produce a suitable coating in three cycles, and that a combination of heavy solution coatings followed by the thin solution produces the best final coating. Subsequent experiments showed that a smoother coating could be produced by passing the slurry through a fritted filter.

The specific concentration of slurries used as the first coating and subsequent coatings varies with the surface finish and porosity of the substrate.

c. Substrate Glazing

The material of the article to be coated with glassy carbon is limited to the non-metals and may be the various forms of carbon, or porous metal oxides. Materials such as carbon, graphite, alumina, zirconia and magnesia are among those to which the glaze will adhere. The article or part is dipped in the slurry for several minutes to allow the slurry to penetrate its pores. It is then air dried to evaporate the solvent. The thus coated article is then baked in an inert atmosphere, such as argon, at a temperature of 800° C. or more for approximately twelve to twenty minutes. The dipping and baking is repeated several times until the desired thickness of glaze is obtained.

Table 1

Results of Decomposition of PVC

| Example No. | Weight g | Decomposition Temp., °C | Decomposition Time, min. | Wt. Loss, % | Resultant Compound Carbon, wt % | Resultant Compound Hydrogen, wt % | Mass Ratio C/H |
|---|---|---|---|---|---|---|---|
| 1 | 25 | 390 | 90 | 75.0 | 91.85 | 7.01 | 13.10 |
| 2 | 50 | 390 | 30 | 72.6 | 92.44 | 7.39 | 12.509 |
| 3 | 50 | 390 | 30 | 75.14 | 92.72 | 7.14 | 12.986 |
| 4 | 500 | 390 | 5 | 67.26 | 91.88 | 7.50 | 12.251 |

Example 1 was dry and examples 2, 3, and 4 were in isopropanol.
Decomposition of all specimen was in an atmosphere of argon.

b. Slurry Blending

The solidified precursor thus prepared is ground to a fineness of 1 – 10 microns and blended with a solvent. Early experiments had shown that properly decomposed PVC precursor was readily soluble in benzene. In the use of natural organic polymers, the resultant pitch is also readily soluble in benzene. Other common solvent materials representing several classes of organic materials were compared to determine their ability to perform satisfactorily as a medium for the glaze slurry. Only the aromatic solvents dissolved the decomposed PVC satisfactorily. Benzene provided the best solubility. Furthermore, when applied to graphite substrates, the slurry made from benzene produced the most satisfactory final glaze coating. The toluene slurry also produced satisfactory results. However, they were sufficiently poorer than the benzene results that toluene is not preferred.

Decomposed PVc was dissolved in benzene in concentrations of 100, 200, 300, and 400 g/liter. The 100 and 200 g/liter solutions were too thin to produce a suitable coating in a limited number of coating cycles; the 300 and 400-g/liter solutions were too heavy after three or four coating cycles and produced runs, bub- The chemical analysis of the glaze shows it is pure carbon having a satin or glossy finish and the physical properties of glass. The most satisfactory glaze coating is about one mil thick.

Glassy carbon coatings are oxidation resistant and may be heated to as high as 500° C. in air without altering their quality or composition. A one mil thick coating will have a permeability to helium of about $10^{-9}$ cc/cm$^2$/sec/cm-Hg and will be effectively impermeable to liquids and gases.

The parameters of the invention may be varied in attaining glassy carbon coatings within the scope of the following claims.

I claim:

1. The process of glazing an article formed from carbon or ceramic material said process comprising:
   a. first heating a mass of an organic glassy-carbon precursor material selected from the group comprising halogenated linear polymers and natural organic polymers in an inert atmosphere until decomposition to a pitch-like compound having the approximate empirical formula $C_nH_n$, where n is a whole number,
   b. blending the resultant compound with an aromatic solvent to form a slurry,
   c. coating the article with the slurry, and, d. baking the article at an elevated temperature in an inert atmosphere until the coating is transformed to glassy carbon.

2. The process is defined in claim 1 wherein the article is subjected to a plurality of coating and baking steps.

3. The process defined in claim 1 wherein the organic precursor material is a polyvinyl resin.

4. The process is defined in claim 3 wherein the organic precursor is polyvinylchloride, the first heating is at a temperature of about 395° C. and the baking is at a temperature of more than 800° C.

5. The process as defined in claim 3 wherein prior to the first heating the mass of organic material is ground to a sand-like granularity and wetted with a heat transfer medium.

6. The process as defined in claim 1 wherein the solvent is benzene.

7. The process as defined in claim 1 wherein the organic precusor material is petroleum and the resultant compound is pretroleum pitch.

8. The process defined in claim 1 wherein the aromatic solvent is benzene and the concentration of the resultant compound in the slurry is between 200 and 450 grams per liter of solution.

9. The process of applying a glassy carbon coating to a ceramic or carbon substrate comprising dissolving a pitch-like composition having the approximate empirical formula $C_nH_n$, where n is a whole number, in an aromatic solvent to provide a slurry, said slurry containing from 200 – 450 grams of the pitch-like composition per liter of solution;

applying a coating of the slurry to the substrate; and baking the coated substrate in an inert atmosphere at a temperature of at least 800° C. until the coating is transformed to glassy carbon.

* * * * *